(12) United States Patent
Takahashi et al.

(10) Patent No.: US 7,692,736 B2
(45) Date of Patent: Apr. 6, 2010

(54) LIQUID CRYSTAL DISPLAY DEVICE HAVING PARTICULAR DIFFERENCES IN AVERAGE THICKNESS OF ADJACENT GLASS SUBSTRATES

(75) Inventors: Hitoshi Takahashi, Yonezawa (JP);
Teruo Fujiwara, Yonezawa (JP);
Megumi Kunimine, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 138 days.

(21) Appl. No.: 12/017,903

(22) Filed: Jan. 22, 2008

(65) Prior Publication Data

US 2008/0186437 A1    Aug. 7, 2008

Related U.S. Application Data

(63) Continuation of application No. PCT/JP2006/313127, filed on Jun. 30, 2006.

(30) Foreign Application Priority Data

Jul. 22, 2005  (JP)  .............................. 2005-212253

(51) Int. Cl.
*G02F 1/1347* (2006.01)
*G02F 1/1335* (2006.01)
*G02F 1/1333* (2006.01)

(52) U.S. Cl. ............................. 349/74; 349/75; 349/117; 349/158

(58) Field of Classification Search .................... 349/75, 349/74, 76, 117, 158
See application file for complete search history.

(56) References Cited

U.S. PATENT DOCUMENTS

| 4,523,812 | A | * | 6/1985 | Penz | ............................ 349/158 |
| 6,906,763 | B2 | * | 6/2005 | Ozeki et al. | .................... 349/75 |
| 2004/0008297 | A1 | | 1/2004 | Ozeki et al. | |

FOREIGN PATENT DOCUMENTS

| EP | 1359460 | 11/2003 |
| JP | 59-140421 | 9/1984 |
| JP | 3-264923 | 11/1991 |
| JP | 6-202090 | 7/1994 |
| JP | 2004-4805 | 1/2004 |

* cited by examiner

*Primary Examiner*—Mike Qi
(74) *Attorney, Agent, or Firm*—Oblon, Spivak, McClelland, Maier & Neustadt, L.L.P.

(57) ABSTRACT

A liquid crystal display device eliminating an uneven display, which is a D-STN type liquid crystal display device having a compensation cell and a liquid crystal cell for display wherein a difference between the average thicknesses of at least two adjacent glass substrates among glass substrates existing in the compensation cell and the liquid crystal cell for display is 4 μm or more, and preferably not more than 50 μm.

19 Claims, 2 Drawing Sheets

LIQUID CRYSTAL DISPLAY DEVICE HAVING PARTICULAR DIFFERENCES IN AVERAGE THICKNESS OF ADJACENT GLASS SUBSTRATES

TECHNICAL FIELD

The present invention relates to a liquid crystal display device, in particular, it relates to a D-STN (double layered super-twisted nematic) type liquid crystal display device.

BACKGROUND ART

Heretofore, various types of liquid crystal display devices such as TN (twisted nematic), STN (super-twisted nematic) type and the like have widely been employed. The TN type has such a system that a nematic liquid crystal is sandwiched by two glass substrates wherein long axis directions of liquid crystal molecules are twisted 90° between the two glass substrates. The STN type has such a system that the twist angle is 180° or more in order to produce a steep change in intensity of transmitting light with respect to an applied voltage. When a dichroic display using a light source color and a black color is to be performed in the STN type, a compensation cell is employed in addition to a liquid crystal cell for display. Such system that a dichroic display with a light source color and a black color is performed by the aid of a compensation cell is called as a D-STN type.

In such D-STN type liquid crystal display device, when a black color was to be produced by blocking light from the backlight, there was a problem that light leaked from a second polarizing plate to thereby cause an uneven display.

In order to solve the above-mentioned problem, a liquid crystal display device is proposed (in for example, Patent Document 1) in which a difference between the thickness of a frontside glass substrate of a liquid crystal cell for display and the thickness of a backside glass substrate of a compensation is 50 µm or more.

Patent Document 1: JP-A-2004-4805

DISCLOSURE OF THE INVENTION

Problem that the Invention is to Solve

The inventors of the present patent application have found that the system disclosed in Patent Document 1 is insufficient to eliminate completely an uneven display.

The present invention is to provide a liquid crystal display device capable of suppressing an uneven display.

Means For Solving The Problem

The present invention provides a D-STN type liquid crystal display device having a compensation cell and a liquid crystal cell for display wherein a difference between the average thicknesses of at least two adjacent glass substrates among glass substrates existing in the compensation cell and the liquid crystal cell for display is 4 µm or more.

Further, the present invention provides a D-STN type liquid crystal display device having a compensation cell and a liquid crystal cell for display wherein a glass substrate constituting adjacent glass substrates in the compensation cell and a liquid crystal cell for display does not have a tilt of thickness difference of 0.1 µm/mm or more or a tilt of thickness difference of −0.1 µm/mm or less at least three consecutive points that are plotted arbitrarily at positions 2 mm away from each other in an arbitrary line in parallel to a long-side direction or a short-side direction of adjacent glass substrates in an overlapping state.

Further, the present invention provides a D-STN type liquid crystal display device having a compensation cell and a liquid crystal cell for display wherein a glass substrate constituting adjacent glass substrates does not have a specified portion in which a thickness difference at same positions in the adjacent glass substrates is 0.1 µm or less.

EFFECT OF THE PRESENT INVENTION

According to the liquid crystal display device of the present invention, an uneven display can be suppressed by employing a glass substrate which satisfies a specific condition with respect to thickness.

Figure 1:
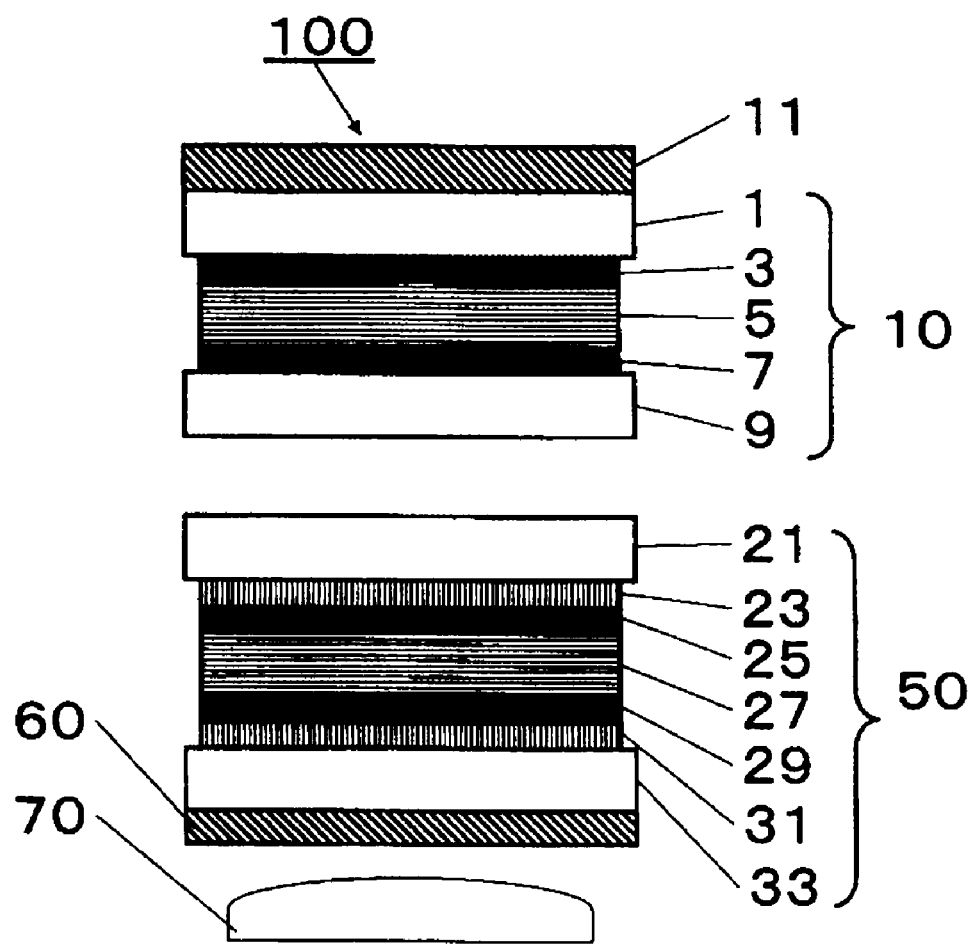
FIG. 1: A diagrammatical cross-sectional view of a liquid crystal display device according to the present invention.

EXPLANATION OF REFERENCE NUMERALS 1, 9, 21, 33: glass substrate
3, 7, 25, 29: orientation film
5, 27: liquid crystal layer
10: compensation cell
11, 60: polarizing plate
23, 31: transparent electrode
50: cell for display
70: backlight
100: liquid crystal display device

BEST MODE FOR CARRYING OUT THE INVENTION

FIG. 1 is a diagrammatical cross-sectional view of a D-STN type liquid crystal display device. In the D-STN type, a liquid crystal cell for display (hereinbelow, referred to as the cell for display) 50 and a compensation cell 10 are provided between a first polarizing plate 60 and a second polarizing plate 11. A backlight 70 is provided at a rear side of the first polarizing plate 60. The side at which the backlight 70 is provided is referred to as the backside and the side at which the second polarizing plate 11 is provided is referred to as the frontside, i.e., an image-displaying side.

The cell for display 50 comprises a liquid crystal layer 27 sandwiched by a pair of glass substrates 21, 33 on which opposing transparent electrodes 23, 31 are formed. The opposing transparent electrodes 23, 31 have respectively orientation films 25, 29 on their opposing surfaces. The compensation cell 10 comprises a liquid crystal layer 5 sandwiched by a pair of glass substrates 1, 9 on which orientation films 3, 7 are formed. The liquid crystal layer 27 of the cell for display 50 and the liquid crystal layer 5 of the compensation cell 10 are in such a relation that their twist angles are identical and the directions of twist angle of a long axis of liquid crystal molecules are opposite to each other. The directions of orientation of liquid crystal molecules at sides of adjacent glass substrates in the cell for display 50 and the compensation cell 10 are perpendicular to each other. Namely, the direction of orientation of liquid crystal molecules at a side of the glass substrate 21 in the liquid crystal layer 10 of the cell for display 50 and the direction of orientation of liquid crystal molecules at a side of the glass substrate 9 in the liquid crystal layer 5 of the compensation cell 10 are perpendicular to each other.

The present invention is characterized in that a difference between the average thicknesses of at least two adjacent glass substrates (hereinbelow, referred to as the thickness difference of adjacent glass substrates) among adjacent glass substrates in glass substrates existing in the compensation cell and the liquid crystal cell for display is 4 µm or more. The method of measuring the average thicknesses will be described later. If the thickness difference of adjacent glass substrates is less than 4 µm, there takes place a phenomenon that frequencies of enhancing wavelengths of light in an interference light overlap in the whole wavelength region, whereby an undesirable uneven display takes place. The adjacent glass substrates signify two glass substrates closest to each other in a state that a compensation cell and a cell for display are arranged vertically. In FIG. 1, for example, the frontside glass substrate 21 of the cell for display and the backside glass substrate 31 of the cell for display, the backside glass substrate 9 of the compensation cell and the frontside glass substrate 21 of the cell for display, and the frontside glass substrate 1 of the compensation cell and the backside glass substrate 9 of the compensation cell constitute respectively the adjacent glass substrates. The thickness difference of adjacent glass substrates is preferably 10 µm or more, particularly 15 µm or more because the uneven display can be suppressed perfectly. Further, the thickness difference of adjacent glass substrates is preferably not less than 50 µm, particularly, 30 µm or less.

Patent Document 1 describes that an uneven display can be prevented when a difference between the thickness of the frontside glass substrate 21 of the cell for display 50 and the thickness of the backside glass substrate 9 of the compensation cell 10 is 50 µm or more. However, such system cannot completely suppress an uneven display. On the other hand, it will be advantageous from the viewpoint of production efficiency for glass substrates to make and use glass substrates having a substantially equal thickness. However, in a case of employing glass substrates having a large deviation of sheet thickness such as 50 µm or more, it is necessary to produce them under different conditions of production, whereby production efficiency decreases. This is a very important problem for glass sheet manufacturers because it is difficult to employ a batch production system. Accordingly, it is preferable that the maximum value of average thickness of four glass substrates in a liquid crystal display device is not more than 50 µm, in particular 30 µm or less.

In addition, there is a requirement of reducing the thickness of a glass substrate as thin as possible in order to reduce the weight of the liquid crystal display device. Generally, there is a requirement to reduce the thickness of the glass substrate to a limit of satisfying the strength of the device. Patent Document 1 describes that in order to make the thickness difference of adjacent glass substrates to be 50 µm or more, it is necessary to reduce the thickness of a glass substrate in the adjacent glass substrates. On the other hand, the liquid crystal display device has to have a sufficient strength for use and accordingly, it is necessary to increase the thickness of the other glass substrate constituting the adjacent glass substrate. This decreases productivity of glass substrates and it may be necessary to change the display system of and designing for the liquid crystal display device. Therefore, it is not desirable from a practical viewpoint to use glass substrates having an extremely large thickness difference as described in Patent Document 1.

Figure 3:
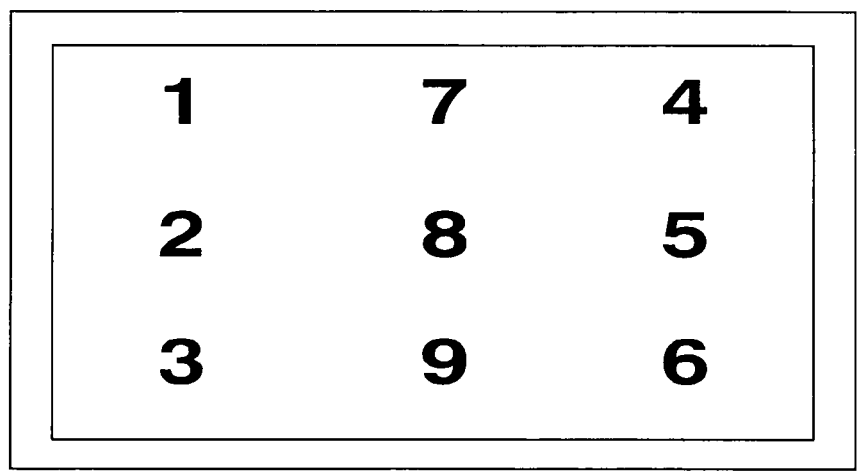
FIG. 3: A plan view illustrating positions for measuring the thickness of a glass substrate.

It is preferred from the standpoint of manufacturing and a performance required that the average thickness of each glass substrate 1, 9, 21 or 33 is in a range of from 0.1 to 1.1 mm. Further, it is preferred from the standpoint of productivity that the size of each glass substrate is from 200 to 1,200 mm long and from 200 to 1,200 mm wide. As how to obtain an average thickness of glass substrates, it is ideal to take an average value of a large number of points plotted on a plane of a substrate. However, in consideration of the peculiarity of producing glass sheets, it is possible to obtain an average thickness as follows. Specifically, as shown in FIG. 3, a plane of a display region of each substrate is sectioned equally into 9 portions (3×3 portions sectioned equally). The thickness of the central portion of each sectioned plane is measured to obtain an average value of 9 measured points. The display region is a portion where a picture image is displayed on the cell for display or the compensation cell. For example, it is a central portion excluding a portion of 10 mm away from each edge, although it depends on a size of picture plane.

Further, in either combination of the frontside glass substrate 21 of the cell for display and the backside glass substrate 33 of the cell for display or the frontside glass substrate 1 of the compensation cell and the backside glass substrate 9 of the compensation cell, these constituting respectively adjacent glass substrates, the thickness difference of adjacent glass substrates is preferably 4 µm or more, particularly 10 µm or more, more preferably 15 µm or more, and not more than 50 µm, more preferably 30 µm or less. It is because it is insufficient to prevent the generation of an uneven display by taking merely the thickness difference between the frontside glass substrate 21 of the cell for display and the backside glass substrate 9 of the compensation cell into consideration as described in Patent Document 1 and it is necessary to take a consideration to other glass substrates. Accordingly, it is particularly preferable that in both combinations of the frontside glass substrate 21 of the cell for display and the backside glass substrate 33 of the cell for display, and the frontside glass substrate 1 of the compensation cell and the backside glass substrate 9 of the compensation cell, the thickness difference of adjacent glass substrates is 4 µm or more, particularly 10 µm or more, more preferably 15 µm or more, and not more than 50 µm, more preferably 30 µm or less. Further, it is further preferred that in all combinations of adjacent glass substrates, the thickness difference of adjacent glass substrates is 4 µm or more, particularly 10 µm or more, furthermore 15 µm or more. However, in consideration of productivity to glass substrates and complete removal of an uneven display, it is preferred that the thickness difference of adjacent glass substrates is not more than 50 µm, particularly 30 µm or less.

Further, in the present invention, it is preferred that a glass substrate constituting adjacent glass substrates in the compensation cell and the liquid crystal cell for display does not have a tilt of thickness difference (hereinbelow, referred to as ΔΔt) of 0.1 µm/mm or more or a tilt of thickness difference of −0.1 µm/mm or less at least three consecutive points that are plotted arbitrarily at positions 2 mm away from each other in an arbitrary line in parallel to a long-side direction or a short-side direction of adjacent glass substrates in an overlapping state. Namely, the inventors of this patent application have found that an uneven display generates when there is ΔΔt having a certain value or more over a certain length or more, and that such uneven display can be prevented by eliminating any portion in which ΔΔt having a certain value or more exists over a certain length or more.

Detailed explanation will be made as to the above-mentioned as follows.

"Glass substrates existing in the compensation cell and the liquid crystal cell for display" signify glass substrates 1, 9, 21, 33 in FIG. 1. "A long-side direction of a glass substrate" signifies a lateral direction of a glass substrate in a case that the glass substrate is rectangular (namely, lengths in lengthwise and breathwise directions are different) wherein the long axis is placed horizontally. "A short-side direction of a glass substrate" signifies a longitudinal direction of a glass substrate in a case that the long axis thereof is placed horizontally. The long-side direction is usually a lateral direction when someone watches a liquid crystal display device and then, the short-side direction will be a longitudinal direction. When a square glass substrate is employed, either side is determined as a long-side direction.

"An arbitrary line in parallel to a long-side direction" is a line arbitrarily selected among an infinite number of lines drawn in parallel to a long-side direction of a glass substrate. From the particularity of production of glass substrates, there is no large change in flatness of planes of the glass substrates and they show a gentle change of flatness. Accordingly, it is possible to select some number of arbitrary lines to evaluate the flatness of the glass substrates.

"Points plotted arbitrarily at positions 2 mm away from each other in an arbitrary line" signify points arranged with intervals of 2 mm, selected arbitrarily along a line. There are an infinite number of starting points in order to select points arranged with intervals of 2 mm on a line. However, since the flatness of a plane of a glass substrate does not show a large change but shows a gentle change, it is possible to conduct evaluations to all lines even when a starting point is determined arbitrarily. Then, thicknesses of adjacent glass substrates are measured at points 2 mm away from each other. Then, a difference between the thicknesses of glass substrates is measured at each position 2 mm away from each other, and further, a difference of thicknesses at adjacent positions is divided by a length (2 mm) at each position. Thus, $\Delta\Delta t$ can be obtained.

Figure 2:
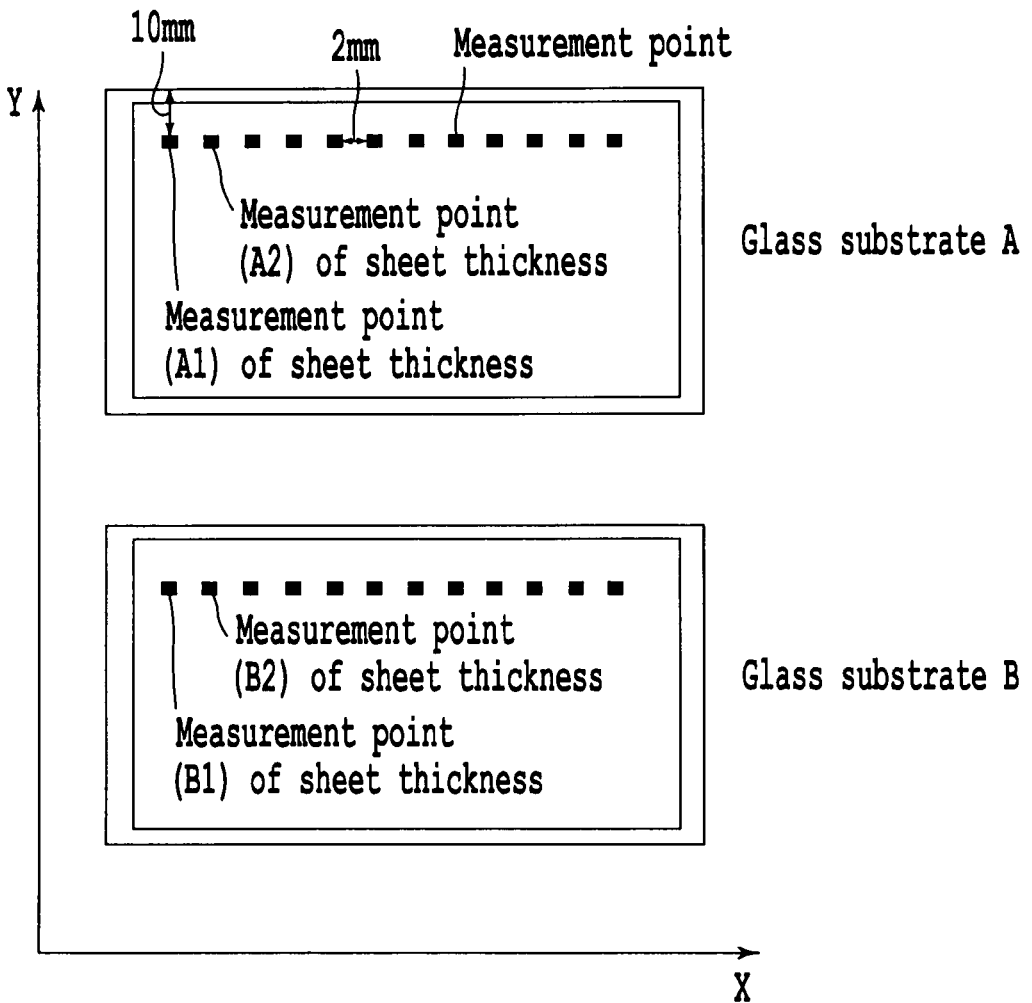
FIG. 2: A diagram illustrating how to obtain $\Delta\Delta t$.

More detailed explanation will be made as to how to obtain $\Delta\Delta t$ with reference to FIG. 2. In FIG. 2, a glass substrate constituting adjacent glass substrates is a glass substrate A and the other is a glass substrate B. For example, in the cell for display 50, the glass substrate A corresponds to the glass substrate 21 in FIG. 1 and the glass substrate B corresponds to the glass substrate 31 in FIG. 1. Solid lines in glass substrates indicate outer dimensions of the glass substrates and broken lines indicate display regions. A long-side direction with respect to the glass substrates is taken as a X-direction and a short-side direction is taken as a Y-direction.

First, the thickness of each of the glass substrates A and B is measured along a line of X-direction. Specifically, in FIG. 2, the thickness of a glass substrate is measured at intervals of 2 mm in a line in the display region, which is 10 mm away from a long side of the glass substrate. Such measurement is carried out for each of the glass substrates A and B. The positions of measurement points are the same for the glass substrate A and glass substrate B. Namely, when these two glass substrates placed in overlapped are observed from the front, measurements of thickness can be performed at the same positions. The measurement is only for the display region because the problem of an uneven display generates in the image display region.

Then, a difference between the thicknesses of the glass substrate A and the glass substrate B at each measurement point is obtained by calculation. For example, when a thickness of the glass substrate A at each measurement point is represented as A1, A2 or the like and a thickness of the glass substrate B at each measurement point is as B1, B2 or the like, it is possible to obtain a difference of thickness in accordance with a formula A1–B1, A2–B2 or the like.

Then, a tilt of thickness difference at adjacent measurement points is obtained. For example, a difference of each value obtained by A1–B1, A2–B2 or the like is divided by 2 mm as a distance between adjacent measurement points. Namely, it is possible to obtain $\Delta\Delta t$ (unit: μm/mm) at each point of the glass substrates by using a formula such as ((A1–B1)–(A2–B2))/2 or the like.

A feature of the present invention resides in that three or more points having $\Delta\Delta t$ of 0.1 μm/mm or more do not exist consecutively or three or more points having a tilt of –0.1 μm/mm or less do not exist consecutively (hereinbelow, the expression that three or more points having $\Delta\Delta t$ of 0.1 μm/mm or more do not exist consecutively, for the both). With such measures, it is unlikely that an uneven display generates. As the reason for preventing an uneven display with such measures, the inventors estimate that it is difficult to recognize an uneven display because the width of interference fringes becomes thick and the intensity of interference light is weakened. A phrase "0.1 μm/mm or more" in this text is not an absolute value but has been evaluated on the basis of real values. For example, when $\Delta\Delta t$ is +0.2 μm/mm, –0.2 μm/mm and +0.2 μm/mm at three consecutive points, $\Delta\Delta t$ of 0.1 μm/mm or more at least three consecutive points" is not applicable.

It is preferred that three or more points having $\Delta\Delta t$ of 0.1 μm/mm or more do not exist consecutively not only in a specified paired adjacent glass substrates but also in other two pairs of adjacent glass substrates. In particular, it is preferred that three or more points having 0.07 μm/mm or more, further 0.05 μm/mm or more, furthermore 0.03 μm/mm or more do not exist consecutively.

It is further preferable that both preferred ranges about the thickness difference of adjacent glass substrates and $\Delta\Delta t$ as described above are satisfied in order to prevent an uneven display more effectively.

The present invention provides a liquid crystal display device wherein in any combination among a frontside glass substrate 1 and a backside glass substrate 9 of the compensation cell, a backside glass substrate 9 of the compensation cell and a frontside glass substrate 21 of the cell for display, and a frontside glass substrate 21 and a backside glass substrate 33 of the cell for display, at least two values among $T_{1-2}$, $T_{2-3}$ and $T_{3-4}$ take at least 4 μm where $T_{1-2}$, $T_{2-3}$ or $T_{3-4}$ is a thickness difference of adjacent glass substrates. The thickness difference of adjacent glass substrates is preferably in particular 10 μm or more, further 15 μm or more, and not more than 50 μm, further 30 μm or less.

By adjusting the thickness difference of adjacent glass substrates to the ranges described above, a liquid crystal display device free from an uneven display can be formed. The reason why an uneven display can be controlled by utilizing the above-mentioned ranges can be considered as follows. When a difference between the average thicknesses of glass substrates constituting a pair of adjacent glass substrates is not more than 4 μm, an uneven display may generate. However, when a difference between the average thicknesses of adjacent glass substrates constituting another pair of adjacent glass substrates is 4 μm or more, the uneven display caused by such pair of adjacent glass substrate is weakened by the other pair whereby it is likely that the uneven display becomes too thin to be observed. Here, the method of obtaining an average thickness of glass substrates is the same as the method described before. Specifically, as shown in FIG. 3, the plane of a display region of each substrates is sectioned equally into 9 portions (3×3 portions sectioned equally), the thickness of a central portion of each sectioned plane is measured to obtain an average value at 9 points.

When two values among $T_{1-2}$, $T_{2-3}$ and $T_{3-4}$ are 4 μm or more, there is in particular no limitation about the remaining one. However, in consideration of suppressing effectively the generation of an uneven display, it is preferred that the remaining one value assumes 4 μm or more, further 10 μm or more, furthermore 15 μm or more, and not more than 50 μm, further 30 μm or less. Namely, it is preferable that all $T_{1-2}$, $T_{2-3}$ and $T_{3-4}$ assume 4 μm or more, further 10 μm or more, furthermore 15 μm or more, and not more than 50 μm, further 30 μm or less.

There is in particular no limitation as to a combination of values having 4 μm or more. However, it is preferred that $T_{3-4}$ is 4 μm or more because an uneven display is unlikely to appear at a side of display cell.

The condition that at least two values among $T_{1-2}$, $T_{2-3}$ and $T_{3-4}$ have a value of 4 μm or more can preferably suppress an uneven display more effectively when such condition is combined with the above-mentioned condition that $\Delta\Delta t$ is 0.1 μm/mm or more.

Further, the present invention provides a liquid crystal display device wherein a glass substrate constituting adjacent glass substrates (a frontside glass substrate 1 of the compensation cell and a backside glass substrate 9 of the compensation cell, a backside glass substrate 9 of the compensation cell and a frontside glass substrate 21 of the cell for display, and a frontside glass substrate 21 of the cell for display and a backside glass substrate 33 of the cell for display) does not have a specified portion in which a thickness difference at same positions in the adjacent glass substrates is 0.1 μm or less. More preferably, a specified portion having a thickness difference of 0.2 μm or less should not be in any glass substrate. In other words, the present invention provides a liquid crystal display device in which the minimum value of thickness difference of each glass substrate constituting adjacent glass substrates exceeds 0.1 μm.

Specifically, a thickness distribution of each glass substrate is measured over the whole plane and thickness differences at the same positions are calculated. In this case, when there is a portion having a thickness difference of 0.1 μm or less, that portion is likely to generate an uneven display. The reason why non-existence of portions having a small thickness difference suppresses an uneven display is considered as follows.

As described before, the major cause of generation of an uneven display resides in that frequencies of enhancing wavelengths of light in an interference light overlap in the whole wavelength region. When glass substrates have some portions of even thickness, dependence of interference light becomes equal between two glass substrates. Namely, although glass substrates have different thicknesses, there is a possibility of generation of an uneven display due to an interference caused by light having a specified wavelength. However, when glass substrates having completely same thickness are used, an uneven display is likely to generate because interference of light takes place in the whole wavelength region. Accordingly, it can be considered that absence of portions having a thickness difference of 0.1 μm or less can prevent an uneven display.

The condition that a glass substrate should not have a specified portion in which a thickness difference of glass substrate is 0.1 μm or less can preferably prevent an uneven display more effectively when such condition is combined with the conditions that two values among $T_{1-2}$, $T_{2-3}$ and $T_{3-4}$ take 4 μm or more and that $\Delta\Delta t$ is 0.1 μm/mm or more.

In manufacturing glass substrates, there is a case that unevenness of thickness generates in glass substrates depending on a manufacturing method or post-treatment. However, when a thin glass is to be formed for a liquid crystal display device, the glass substrate is apt to have a thickness deviation in a certain direction owing to characteristics of manufacturing. Accordingly, consideration should be made as to a specified line in either a long-side direction or a short-side direction in order to suppress an uneven display.

With respect to formulation for a glass substrate, it is preferred to use sodalime glass or non-alkali glass (glass substantially free from alkali) from the viewpoint that it is useful for a liquid crystal display device.

EXAMPLES

Example 1

Two glass substrates of 50 mm long and 60 mm wide were prepared (hereinbelow, referred to as Sample 1 and Sample 2). Average thicknesses of the glass substrates of Sample 1 and Sample 2 were measured to obtain a thickness difference in a manner as described below. The average thickness difference was 28 μm.

Measurement Method for Average Thicknesses of Glass Substrates

The display region of each substrate was sectioned into 9 equivalent portions (3×3 portions sectioned equally) to obtain measurement points 1 to 9 as shown in FIG. 3. Each point was measured with ultrasonic precision thickness gauge (manufactured by Krautkramer Branson, model: CL304). The values of thickness at 9 points measured were averaged to obtain an average thickness of a glass substrate. A portion of 10 mm away from each edge of a glass substrate was not measured because this portion does not serve as a picture display region, and therefore measurement was conducted only to the display region.

Then, thicknesses of glass substrates were measured along a line of Y=15 mm (a line 15 mm away from an edge) of the Samples 1 and 2 with intervals of 2 mm as shown in FIG. 2. The measurement of thickness was conducted with a laser type thickness gauge (manufactured by Anritsu Corp., model: KL7202A). A portion of 10 mm away from each edge of a glass substrate was not measured because this portion does not serve as a picture display region, and therefore, measurement was conducted only to the display region. Then, the thickness difference between Samples 1 and 2 at each measurement point was calculated. Results are shown in Table 1. In Table 1, X1 indicates a value of A1−B1. A value of X2 and subsequent values are expressed similarly. Further, $\Delta\Delta t$ (μm/mm) at each point was obtained by calculations according to formulas ((X1)−(X2))/2, etc. Results are also shown in Table 1.

Sample 1 was placed in front of a compensation cell and Sample 2 was placed in rear (at the side of a cell for display) of the compensation cell to complete a compensation cell. Further, a glass substrate of 50 mm long, 60 mm wide and 0.7 mm thick was placed in front (at the side of the compensation cell) of a cell for display and a glass substrate of 50 mm long, 60 mm wide and 0.7 mm thick was placed at the rear side (at the side of a backlight) to complete a cell for display.

A first polarizing plate 11, a second polarizing cell 60 and a backlight 70 were arranged on the compensation cell 10 and the cell for display 50 prepared as described above, whereby a D-STN type liquid crystal display device as shown in FIG. 1 was formed.

In evaluation of the thus formed liquid crystal display device according to the below-mentioned method in order to find an uneven display, no uneven display was found.

Method for Evaluating an Uneven Display

A liquid crystal display device is subjected to visual check to find interference fringes under a fluorescent tube of 1,500 lux without applying a voltage to the device, and presence or absence of interference fringes is evaluated.

Example 2

Two glass substrates of 50 mm long and 60 mm wide were prepared (hereinbelow, referred to as Sample 3 and is Sample 4). Average thicknesses of the glass substrates of Sample 3 and Sample 4 were measured to obtain a thickness difference in a manner as Example 1. The average thickness difference was 15 μm.

On such Sample 3 and Sample 4, thickness differences at points arranged with intervals of 2 mm were obtained in the same manner as Example 1. Results are shown in Table 1. Further, ΔΔt at each point was obtained in the same manner as Example 1. Results are also shown in Table 1.

A liquid crystal display device was formed in the same manner as Example 1 except that Sample 3 and Sample 4 were placed instead of Sample 1 and Sample 2 respectively.

On this liquid crystal display device, an uneven display was evaluated in the same manner as Example 1. No uneven display was found.

A liquid crystal display device was formed in the same manner as in Example 1 except that Sample 5 and Sample 6 are placed instead of Sample 1 and Sample 2 respectively.

On this liquid crystal display device, an uneven display is evaluated in the same method as in Example 1. A certain degree of unevenness was recognized. However, there was no problem in practical use.

Example 4

Comparative Example

Two glass substrates of 50 mm long and 60 mm wide were prepared (hereinbelow, referred to as Sample 7 and Sample 8). Average thicknesses of the glass substrates of Sample 7 and Sample 8 were measured to obtain a thickness difference according to the same method as in Example 1. The average thickness difference was 0 μm. On Sample 7 and Sample 8, thickness differences at points arranged with intervals of 2 mm was obtained in the same method as in Example 1. Results are shown in Table 2. Further, ΔΔt at each point was obtained in the same method as in Example 1. Results are also shown in Table 2.

A liquid crystal display device was formed in the same manner as Example 1 except that Sample 7 and Sample 8 were placed instead of Sample 1 and Sample 2 respectively.

On this liquid crystal display device, an uneven display was evaluated in the same method as Example 1. A problematic uneven display in practical use was recognized.

TABLE 1

| | Example 1 | | Example 2 | |
| --- | --- | --- | --- | --- |
| | Thickness difference (μm) | ΔΔt (μm/mm) | Thickness difference (μm) | ΔΔt (μm/mm) |
| X1 | 27.35 | −0.145 | 15.10 | −0.005 |
| X2 | 27.64 | −0.040 | 15.11 | −0.075 |
| X3 | 27.72 | −0.045 | 15.26 | −0.005 |
| X4 | 27.81 | 0.200 | 15.27 | −0.005 |
| X5 | 27.41 | 0.090 | 15.28 | −0.100 |
| X6 | 27.23 | 0.200 | 15.48 | 0.020 |
| X7 | 26.83 | −0.285 | 15.44 | −0.130 |
| X8 | 27.40 | −0.145 | 15.70 | 0.020 |
| X9 | 27.69 | 0.025 | 15.66 | 0.000 |
| X11 | 27.64 | −0.200 | 15.66 | −0.030 |
| X12 | 28.04 | 0.035 | 15.72 | 0.000 |
| X13 | 27.97 | −0.015 | 15.72 | −0.005 |
| X14 | 28.00 | −0.050 | 15.73 | 0.035 |
| X15 | 28.10 | −0.215 | 15.66 | 0.005 |
| X16 | 28.53 | 0.000 | 15.65 | 0.090 |
| X17 | 28.53 | 0.585 | 15.47 | 0.000 |
| X18 | 27.36 | −2.525 | 15.47 | 0.005 |
| X19 | 32.41 | 2.595 | 15.46 | −0.165 |
| X20 | 27.22 | −0.905 | 15.79 | −0.075 |
| X21 | 29.03 | | 15.94 | |

Example 3

Two glass substrates of 50 mm long and 60 mm wide were prepared (hereinbelow, referred to as Sample 5 and Sample 6). Average thicknesses of the glass substrates of Sample 5 and Sample 6 were measured to obtain a thickness difference according to the same method as in Example 1. The average thickness difference was 7 μm. Further, on Sample 5 and Sample 6, thickness differences at points arranged with intervals of 2 mm were obtained in the same method as in Example 1. Results are shown in Table 2. Further, ΔΔt at each point was obtained in the same method as in Example 1. Results are also shown in Table 2.

TABLE 2

| | Example 3 | | Example 4 | |
| --- | --- | --- | --- | --- |
| | Thickness difference (μm) | ΔΔt (μm/mm) | Thickness difference (μm) | ΔΔt (μm/mm) |
| X1 | 7.90 | −0.100 | −1.18 | −0.055 |
| X2 | 8.10 | 0.060 | −1.07 | −0.220 |
| X3 | 7.98 | 0.050 | −0.63 | 0.280 |
| X4 | 7.88 | 0.345 | −1.19 | −0.020 |
| X5 | 7.19 | 0.000 | −1.15 | −0.040 |
| X6 | 7.19 | 0.180 | −1.07 | −0.110 |
| X7 | 6.83 | 0.065 | −0.85 | −0.045 |
| X8 | 6.70 | 0.050 | −0.76 | −0.130 |
| X9 | 6.60 | 0.260 | −0.50 | −0.085 |
| X11 | 6.08 | 0.070 | −0.33 | −0.050 |
| X12 | 5.94 | −0.065 | −0.23 | −0.120 |
| X13 | 6.07 | 0.180 | 0.01 | −0.110 |
| X14 | 5.71 | 0.170 | 0.23 | −0.155 |
| X15 | 5.37 | 0.110 | 0.54 | 0.220 |
| X16 | 5.15 | 0.020 | 0.10 | 0.085 |
| X17 | 5.11 | −0.135 | −0.07 | −0.625 |
| X18 | 5.38 | 0.120 | 1.18 | −0.840 |
| X19 | 5.14 | 0.010 | 2.86 | 1.065 |
| X20 | 5.12 | −0.030 | 0.73 | −0.055 |
| X21 | 5.18 | | 0.84 | |

In the liquid crystal display devices of Example 1 and Example 2, a difference between the thicknesses of glass substrates is 4 μm or more and at least three points of ΔΔt of 0.1 or more do not appear consecutively, whereby an uneven display does not take place and they are excellent.

On the other hand, in the liquid crystal display device of Example 3, although a difference between the thicknesses of glass substrates is 5 μm or more, at least three points of ΔΔt of 0.1 or more appear consecutively (as seen in X13 to X15), whereby a slight degree of uneven display generates.

In the liquid crystal display device of Example 4, a difference between the thicknesses of glass substrates is less than 5 μm, and at least three points of ΔΔt of 0.1 μm or more appear consecutively (as seen in X12 to X14), whereby a substantial degree of uneven display generates.

Example 5

Four glass substrates of 50 mm long and 60 mm wide were prepared (hereinbelow, referred to as Samples 9 to 12). Average thicknesses of the glass substrates of Samples 9 to 12 were measured in the same method as "Measurement method for average thickness of glass substrate" in Example 1 to obtain average thickness differences of glass substrates. Results are shown in Table 3. Glass substrates of Samples 9 to 12 were used respectively for a frontside glass substrate 1 of the compensation cell, a backside substrate 9 of the compensation cell, a frontside glass substrate 21 of the cell for display and a backside glass substrate 33 of the cell for display to form a liquid crystal display device as shown in FIG. 1.

Presence or absence of an uneven display was evaluated for the formed liquid crystal display device according to the same method as "Method of evaluating an uneven display" in Example 1. Results are shown in Table 3.

Examples 6 and 7

Liquid crystal display devices were formed in the same manner as Example 5 except that glass substrates different from those of Example 5 were used. On these liquid crystal display devices, presence or absence of an uneven display was evaluated in the same manner as Example 5. Results are shown in Table 3.

TABLE 3

| Ex. | Average thickness ($\mu$m) | | | | Average thickness difference ($\mu$m) | | | Presence or absence of unevenness |
|---|---|---|---|---|---|---|---|---|
| | Sample 9 | Sample 10 | Sample 11 | Sample 12 | Sample 9-10 | Sample 10-11 | Sample 11-12 | |
| 5 | 719 | 699 | 712 | 718 | 20 | 13 | 6 | Absent |
| 6 | 719 | 699 | 719 | 719 | 20 | 20 | 0 | Present (Thin) |
| 7 | 719 | 699 | 700 | 701 | 20 | 1 | 1 | Present (Thick) |

In Example 5, since average thickness differences were 4 $\mu$m or more in all combinations of samples, no uneven display took place. However, in Example 6, the thickness difference was less than 4 $\mu$m in a combination of samples (Samples 11 and 12), and accordingly, a thin uneven display took place although it is slight. The thin uneven display in Example 6 was of a level free from a problem as the liquid crystal display device.

In Example 7, however, thickness differences were less than 4 $\mu$m in two combinations (Samples 10 and 11 and Samples 11 and 12), a thick uneven display took place.

Example 8

Four glass substrates of 50 mm long and 60 mm wide were prepared (hereinbelow, referred to as Samples 13 to 16). Thickness distributions of glass substrates of Samples 13 to 16 were measured as follows to obtain thickness differences between Samples 13 and 14, Samples 14 and 15 and Samples 15 and 16. In this case, thickness differences at the same positions over the entire plane of the substrates exceed 0.1 $\mu$m in all combinations of Samples 13 and 14, Samples 14 and 15 and Samples 15 and 16.

Measurement Method (Laser) for Thickness Distribution of Glass Substrate

The thickness of each glass substrate was measured optically by using a laser thickness gauge (Interferometer type profilemeter, manufactured by Zygo Corporation). By using this apparatus, the thickness of a glass substrate can be measured over its entire plane and the measured values can be taken as electrical data. Then, thickness differences between the glass substrate of Sample 13 and the glass substrate of Sample 14 were obtained over the entire plane of the substrates. Similarly, the thickness differences between Samples 14 and 15 and Samples 15 and 16 were also obtained.

Then, glass substrates of Samples 13 to 16 were used respectively as a frontside glass substrate 1 of the compensation cell, a backside glass substrate 9 of the compensation cell, a frontside glass substrate 21 of the cell for display and a backside glass substrate 33 of the cell for display to form a liquid crystal display device as shown in FIG. 1. In the evaluation of presence or absence of uneven display to the formed liquid crystal display device according to the same method as "Method of evaluating an uneven display" in Example 1, no uneven display was recognized.

Example 9

On glass substrates different from those in Example 8, thickness distributions were measured in the same manner as Example 8 to obtain thickness differences. In this case, there existed a part having a thickness difference of 0.1 $\mu$m or less in a specified portion of a glass substrate in one combination of samples.

A liquid crystal display device was formed in the same manner as Example 8 by using each of these glass substrates and evaluation of an uneven display was conducted. An uneven display took place at a part having a thickness difference of 0.1 $\mu$m or less.

INDUSTRIAL APPLICABILITY

The liquid crystal display device of the present invention is useful because an uneven display can be prevented.

The entire disclosure of Japanese Patent Application No. 2005-212253 filed on Jul. 22, 2005 including specification, claims, drawings and summary is incorporated herein by reference in its entirety.

What is claimed is:

1. A D-STN type liquid crystal display device having a compensation cell and a liquid crystal cell for display, wherein in said liquid crystal display device, a difference between the average thicknesses of at least two adjacent glass substrates among glass substrates existing in the compensation cell and the liquid crystal cell for display is at least 4 μm and not more than 50 μm.

2. The D-STN type liquid crystal display device according to claim 1, wherein in a combination of a backside glass substrate in the compensation cell and a frontside glass substrate in the liquid crystal cell for display, a difference between the average thicknesses of glass substrates in combination is at least 4 μm and not more than 50 μm.

3. The D-STN type liquid crystal display device according to claim 2, wherein a difference between the average thicknesses of adjacent substrates is not more than 50 μm.

4. The D-STN type liquid crystal display device according to claim 2, wherein a glass substrate constituting adjacent glass substrates in the compensation cell and the liquid crystal cell for display does not have a tilt of thickness difference of 0.1 μm/mm or more or a tilt of thickness difference of 0.1 μm/mm or less at least three consecutive points that are plotted arbitrarily at positions 2 mm away from each other in an arbitrary line in parallel to a long-side direction or a short-side direction of adjacent glass substrates in an overlapping state.

5. The D-STN type liquid crystal display device according to claim 1, wherein in either combination of a frontside glass substrate and a backside glass substrate in the liquid crystal cell for display or a frontside glass substrate and a backside glass substrate in the compensation cell, a difference between the average thicknesses of glass substrates in combination is at least 4 μm and not more than 50 μm.

6. The D-STN type liquid crystal display device according to claim 5, wherein a difference between the average thicknesses of adjacent substrates is not more than 50 μm.

7. The D-STN type liquid crystal display device according to claim 5, wherein a glass substrate constituting adjacent glass substrates in the compensation cell and the liquid crystal cell for display does not have a tilt of thickness difference of 0.1 μm/mm or more or a tilt of thickness difference of −0.1 μm/mm or less at least three consecutive points that are plotted arbitrarily at positions 2 mm away from each other in an arbitrary line in parallel to a long-side direction or a short-side direction of adjacent glass substrates in an overlapping state.

8. The D-STN type liquid crystal display device according to claim 1, wherein a glass substrate constituting adjacent glass substrates in the compensation cell and the liquid crystal cell for display does not have a tilt of thickness difference of 0.1 μm/mm or more or a tilt of thickness difference of −0.1 μm/mm or less at least three consecutive points that are plotted arbitrarily at positions 2 mm away from each other in an arbitrary line in parallel to a long-side direction or a short-side direction of adjacent glass substrates in an overlapping state.

9. The D-STN type liquid crystal display device according to claim 8, wherein said difference is 15 μm or more and 30 μm or less.

10. The D-STN type liquid crystal display device according to claim 1, wherein in any combination among a frontside glass substrate and a backside glass substrate of the compensation cell, a backside glass substrate of the compensation cell and a frontside glass substrate of the liquid crystal cell for display, and a frontside glass substrate and a backside glass substrate of the liquid crystal cell for display, at least two values among $T_{1-2}$, $T_{2-3}$ and $T_{3-4}$ are at least 4 μm where $T_{1-2}$, $T_{2-3}$ or $T_{3-4}$ is a difference between average thicknesses of adjacent glass substrates.

11. The STN-type liquid crystal display device according to claim 10, wherein $T_{3-4}$ is at least 4 μm.

12. The D-STN type liquid crystal display device according to claim 1, wherein a glass substrate constituting adjacent glass substrates does not have a specified portion in which a thickness difference at same positions in the adjacent glass substrates is 0.1 μm or less.

13. The D-STN type liquid crystal display device according to claim 12, wherein said difference between the average thicknesses of at least two pair of adjacent glass substrates is 15 μm or more and 30 μm or more.

14. The D-STN type liquid crystal display device according to claim 1, wherein said difference is 15 μm or more and 30 μm or less.

15. A D-STN type liquid crystal display device having a compensation cell and a liquid crystal cell for display, wherein in said liquid crystal display device, a glass substrate constituting adjacent glass substrates in the compensation cell and the liquid crystal cell for display does not have a tilt of thickness difference of 0.1 μm/mm or more or a tilt of thickness difference of 0.1 μm/mm or less at least three consecutive points that are plotted arbitrarily at positions 2 mm away from each other in an arbitrary line in parallel to a long-side direction or a short-side direction of adjacent glass substrates in an overlapping state.

16. The D-STN type liquid crystal display device according to claim 15, wherein in any combination among a frontside glass substrate and a backside glass substrate of the compensation cell, a backside glass substrate of the compensation cell and a frontside glass substrate of the liquid crystal cell for display, and a frontside glass substrate and a backside glass substrate of the liquid crystal cell for display, at least two values among $T_{1-2}$, $T_{2-3}$ and $T_{3-4}$ are at least 4 μm where $T_{1-2}$, $T_{2-3}$ or $T_{3-4}$ is a difference between average thicknesses of adjacent glass substrates.

17. The D-STN type liquid crystal display device according to claim 16, wherein $T_{3-4}$ is at least 4 μm.

18. The D-STN type liquid crystal display device according to claim 15, wherein a glass substrate constituting adjacent glass substrates does not have a specified portion in which a thickness difference at same positions in the adjacent glass substrates is 0.1 μm or less.

19. A D-STN type liquid crystal display device having a compensation cell and a liquid crystal cell for display, wherein in said liquid crystal display device, a glass substrate constituting adjacent glass substrates does not have a specified portion in which a thickness difference at same positions in the adjacent glass substrates is 0.1 μm or less.

* * * * *